(12) United States Patent
Liu

(10) Patent No.: US 6,763,863 B2
(45) Date of Patent: Jul. 20, 2004

(54) HYDRAULIC CIRCUITS FOR TREE-HARVESTING KNUCKLE BOOMS

(75) Inventor: William Pierre Liu, Brantford (CA)

(73) Assignee: Tigercat Industries Inc., Paris (CA)

( * ) Notice: Subject to any disclaimer, the term of this patent is extended or adjusted under 35 U.S.C. 154(b) by 63 days.

(21) Appl. No.: 10/199,862

(22) Filed: Jul. 19, 2002

(65) Prior Publication Data

US 2004/0011427 A1 Jan. 22, 2004

(51) Int. Cl.[7] .............................................. A01G 23/08
(52) U.S. Cl. .................. 144/4.1; 144/336; 144/382; 144/34.1; 60/421; 60/428; 37/348
(58) Field of Search ................................ 144/335, 336, 144/382, 4.1, 34.1, 34.5, 356, 2.1; 60/421, 428, 429, 430, 432; 37/348, 302

(56) References Cited

U.S. PATENT DOCUMENTS

| | | | | |
|---|---|---|---|---|
| 2,598,233 A | * | 5/1952 | Deardorff | 91/513 |
| 3,583,585 A | * | 6/1971 | Joyce | 414/694 |
| 3,960,284 A | * | 6/1976 | Carpenter | 414/694 |
| 4,039,010 A | * | 8/1977 | Tucek | 144/34.1 |
| 4,898,219 A | * | 2/1990 | Pomies | 144/24.13 |
| 5,107,912 A | * | 4/1992 | Cote et al. | 144/338 |
| 5,170,825 A | * | 12/1992 | Elliot | 144/34.1 |
| 5,293,914 A | * | 3/1994 | Hudson | 144/24.13 |
| 5,528,843 A | * | 6/1996 | Rocke | 37/348 |
| 6,443,196 B1 | * | 9/2002 | Kurelek | 144/4.1 |

FOREIGN PATENT DOCUMENTS

CA 2317670 4/2001

* cited by examiner

Primary Examiner—Allen Ostrager
Assistant Examiner—Shelley M Self
(74) Attorney, Agent, or Firm—Hodgson Russ

(57) ABSTRACT

A hydraulic valve is used to judiciously shunt oil from lowering ends of the hoist and stick cylinders that have been plumbed to achieve near horizontal movement. This allows the use of cylinders that have unequal rod/bore ratios or to compensate for certain transient effects that may require the exchange of oil to the reservoir. The action of the hydraulic valve acts without obtrusive operator intervention and is essentially automatic. This allows for greater flexibility in the design of the boom system, allows the boom system to perform various tasks, while not requiring obtrusive intervention from the operator.

8 Claims, 8 Drawing Sheets

PRIOR ART

PRIOR ART

HYDRAULIC CIRCUITS FOR TREE-HARVESTING KNUCKLE BOOMS

FIELD OF THE INVENTION

The intention of this invention is to increase the flexibility of implementation of knuckle boom systems utilizing knuckle boom hydraulic circuits described in Canadian Patent 2,317,670.

The aforementioned patents aim to achieve horizontal reaching with greater energy efficiency and greater operator ease. This is achieved by hydraulically transferring gravitational potential energy between the cylinders supporting the main boom and the stick boom and creating near horizontal movement with 1 operator control. Another cylinder is mechanically connected either like the stick cylinder or like the hoist cylinder and is hydraulically controlled independently of the hoist and the stick cylinder. This 3rd cylinder controls the geometric relationship between the main boom and the stick boom.

During normal operation, the implement is held above the ground and the main boom and the stick boom must support the weight of the implement and payload. The hydraulic port of the cylinder that must be pressurized to support the load (with the knuckle boom system in the far reach position) will be referred to as the lifting end of the cylinder. The opposite end of the cylinder will be referred to as the lowering end of the cylinder. (However, there are some booms whose geometry cause 1 or both cylinder to reverse while traversing from the far reach position to close reach position).

The lifting ends of the cylinders are connected hydraulically together to allow transferring of potential energy from one cylinder to the other. For a feller buncher, typically the lifting ends of the cylinders are the base ends of the cylinders.

To reduce the amount of oil flowing to and from tank when the third cylinder is stroked while the hydraulic controls for the stick and hoist are not actuated, the lowering ends of hoist and stick are connected hydraulically in a similar manner, as were the lifting ends.

While most of the time, the lifting ends of the cylinders are pressurized; there are situations where the load on the cylinders must reverse direction. This typically occurs when pushing the implement into the ground or pulling backwards towards the carrier.

To allow for reversing of the cylinder loads and to allow the 3rd cylinder to work independently of the hydraulic control of the hoist and stick cylinder, the oil flow out of the lowering ends of the hoist and stick cylinders must be controlled wisely.

This can be accomplished in several ways:

First, eliminate the fluid exchange to and from the hydraulic tank by matching the area ratio of the lowering ends and the lifting ends between the hoist cylinder and the stick cylinder.

The following equation must be true:

$$\frac{AREA\_Hoist_{LIFTING}}{AREA\_Hoist_{LOWER}} = \frac{AREA\_Stick_{LIFTING}}{AREA\_Stick_{LOWER}}$$

Second, have the operator manually activate a valve during these motions. If the area ratios are unequal.

Third automatically open a valve to allow the fluid out during these motions. If the area ratios are unequal.

The first option requires keeping the area ratios between the hoist and stick cylinders equal. However, the requirements of the hoist cylinder and stick cylinder are often very different. The volume of fluid in the lifting end of the hoist cylinder tends to be greater than the volume of fluid in the lifting end of the stick cylinder. This would necessitate using cylinders with exactly the same bore and rod sizes and different strokes, using specifically sized cylinders with the same bore to rod ratio, but with different bores and rod sizes or using multiple cylinders in parallel that have the same bore and rod size. Also, hoist and stick cylinders would have to have the same orientation. With both cylinders either pushing or pulling. If the above requirements cannot be met, then there will be a net change in the volume of the lowering ends when the third cylinder is activated alone.

If the bore/rod ratios of the hoist and stick cylinder cannot be made equal, then there will be an exchange of fluid between the lowering ends and the reservoir when the third cylinder is stroked by itself.

Hence the second and third options allow greater flexibility in the selection of cylinders sizes and orientation of the hoist cylinder and the stick cylinder. However, this flexibility requires managing the exchange of fluid from the lowering ends when the third cylinder is stroked. The third option doesn't require special operator intervention, but may require some non-intrusive intervention by operation.

Even if the area ratios are maintained, there may be times where transient exchanges of fluid will be required between the lowering ends and the reservoir. This can occur for instance when stroking near the cushions of the cylinders.

SUMMARY OF THE INVENTION

A hydraulic valve is used to judiciously shunt oil from lowering ends of the hoist and stick cylinders that have been plumbed to achieve near horizontal movement. This allows the use of cylinders that have unequal rod/bore ratios or to compensate for certain transient effects that may require the exchange of oil to the reservoir. The action of the hydraulic valve acts without obtrusive operator intervention and is essentially automatic. This allows for greater flexibility in the design of the boom system, allows the boom system to perform various tasks, while not requiring obtrusive intervention from the operator.

BRIEF DESCRIPTION OF THE DRAWINGS

The invention will now be described with reference to the accompanying drawings. In the drawings:

FIG. 1A shows the knuckle boom retracted, and FIG. 1B shows it extended.

BACKGROUND INFORMATION

Partial Description of Canadian Patent 2,317,670 and U.S. provisional No. 60/157,125

It is an object of the previous invention to avoid excessive hydraulic oil heat generation and excessive fuel consumption during reaching in and out, and to do this without significantly changing the hydraulic pump and valve systems of the carrier machines, nor departing from the structural compactness and sturdiness of the prior art knuckle booms.

Another object of the preferred embodiment of the previous invention is to provide for easier operation and training, by allowing a beginner operator to achieve near horizontal tool path travel using only one control motion, for example a back and forth hand control lever, resulting in a much shorter learning time than with the two levers of the prior art. The operator's other hand is thus freed for controlling the tilt of the tool.

In the previous invention, therefore, hydraulic line connections are arranged so that simultaneous supply and dumping of load-supporting pressurized oil during reaching is avoided, so that engine power is needed primarily for friction and flow losses.

Figure 1A:
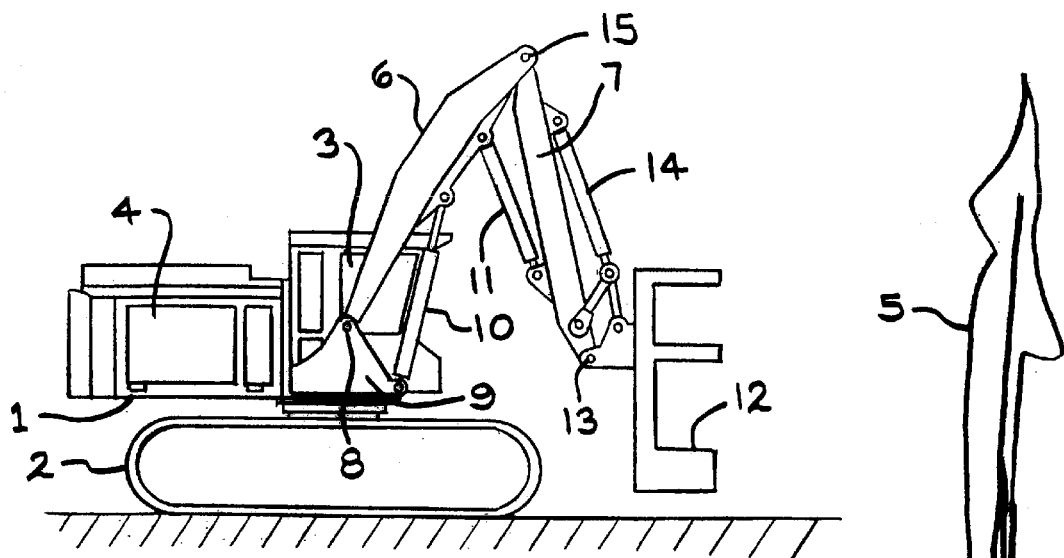
FIGS. 1A and 1B (both prior art) are side elevation views showing how prior art knuckle boom geometry is typically arranged and how the cylinders must alternately contract and extend to achieve tucking-in to reaching-out action.
Figure 1B:
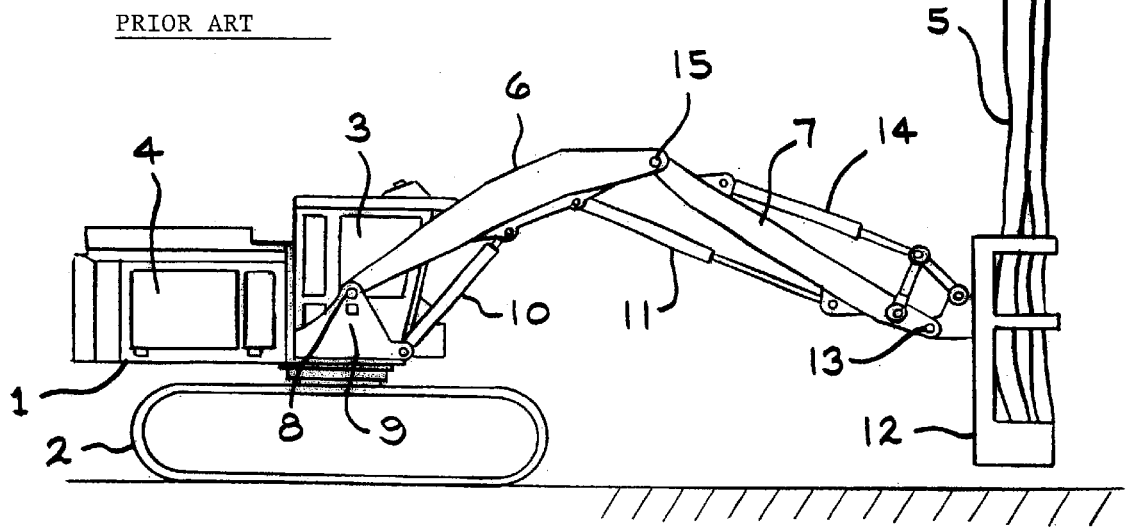

FIG. 1A shows a typical prior art configuration of a feller buncher for tree harvesting, in a retracted or "close reach" position. FIG. 1B shows it in an extended or "far reach" position. There is a machine base 1 supported above vehicle tracks 2. An operator's cab 3 is mounted on the machine base, and a diesel engine 4 is cantilevered on the back of the machine base. The knuckle boom assembly comprises a hoist boom 6, and a stick boom 7. The hoist boom is pivotally mounted relative to the machine base, for example at a hoist-base pivot pin 8 on a mounting bracket 9 secured to the machine base. The stick boom is pivotally connected to the distal end of the hoist boom at a hoist-stick pivot pin 15. The hoist boom is actuated by at least one hydraulic hoist cylinder 10 located underneath the hoist boom and connected between the machine base and the hoist boom, at an effective angle relative to the hoist boom. The stick boom is actuated by at least one stick cylinder 11 located beneath the hoist and stick boom connected between the hoist boom and the stick boom, at an effective angle relative to the stick boom. A tool, such as a feller-buncher head 12 (not shown in detail), is carried at the distal end of the stick boom. Commonly, the tool must also be kept level, and is therefore pivotally mounted about a horizontal axis at a tool-stick pivot pin 13 at the distal end of the stick boom. A tilt cylinder 14 is connected between the stick boom and the tool to control the angle of the tool relative to the stick boom. In FIGS. 1A and 1B, the tilt cylinder is shown pinned above the boom stick and acting on the head through a crank and link set (to achieve a larger tilt angle range). It is not significant to the invention whether such a crank linkage is used or not, or whether the cylinder is above the stick boom, or below it as shown for example in FIG. 3A.

The invention generally has or can have the same components as in the prior art, but also has an additional hydraulic cylinder and different connection lines. It is helpful to compare the circuit drawings for the invention with typical prior art circuit drawings, to understand the differences in the hydraulic conduit connections which cause the improvement in operation.

Figure 2:
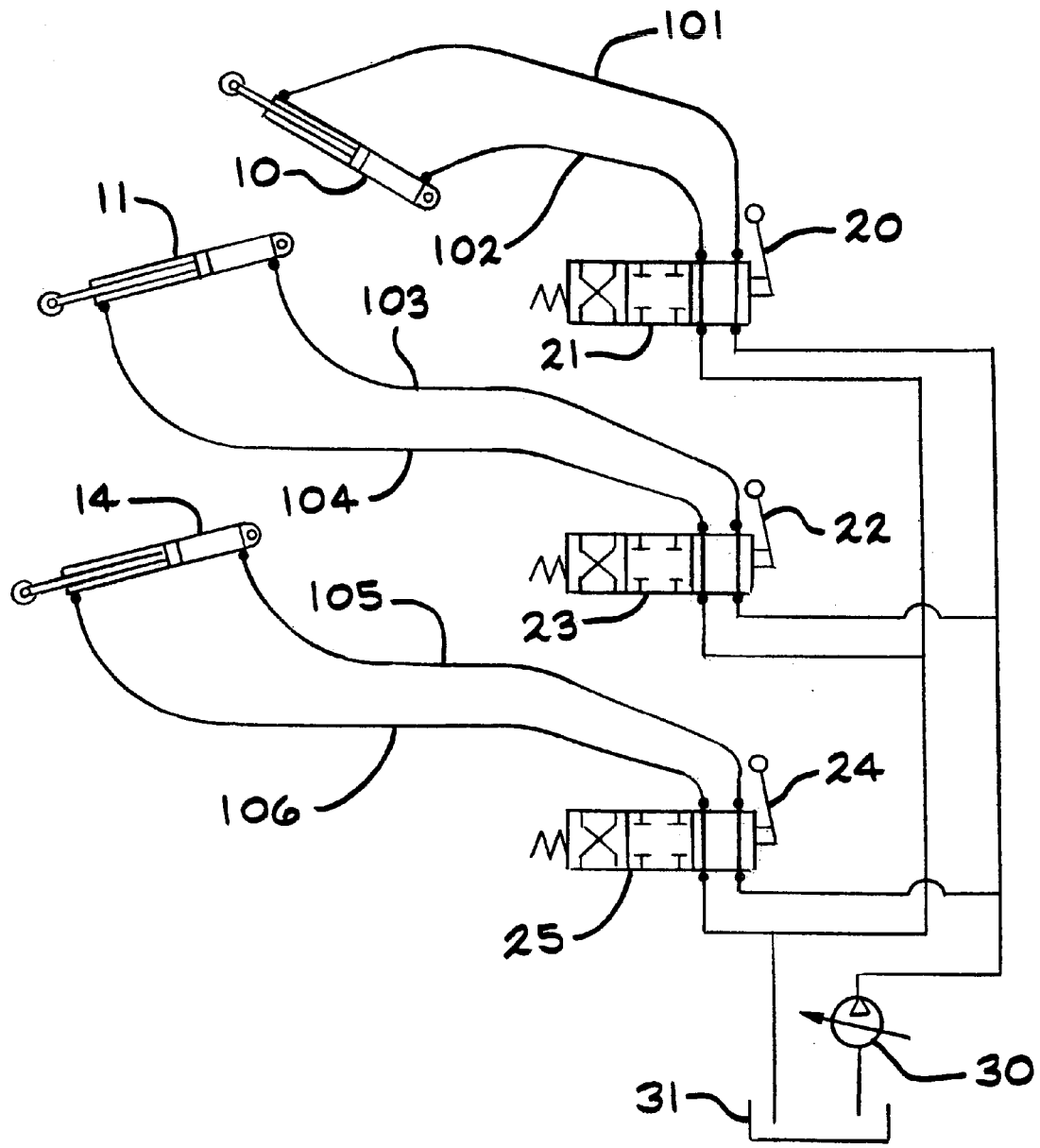
FIG. 2 (prior art) is a schematic diagram of typical prior art oil flow conduit connections between the major components.

FIGS. 1A and 1B show how knuckle boom geometry is typically arranged in the prior art, and how the cylinders must alternately contract and extend to achieve reaching and tucking action. FIG. 2 is a schematic diagram of typical oil flow connections in the prior art. Each of the three cylinders has its two ports connected individually by separate hydraulic conduits to the two work ports on respective directional control valves. Thus the hoist cylinder 10 is operated by a hoist control lever 20 through a hoist directional control valve 21. The hydraulic conduit line 101 connects one of the work ports on valve 21 to the rod end port of the hoist cylinder, and conduit 102 connects the other work port of valve 21 to the base end port of the hoist cylinder 10.

Similarly, the stick cylinder 11 is operated by a stick control 22 through a stick directional control valve 23 and conduit lines 103 and 104. Finally, the tilt cylinder 14 is operated by a tilt control 24 through a tilt directional control valve 25 and conduit lines 105 and 106.

Thus each control and valve operates its own cylinder and no other. Since all three cylinders must operate simultaneously and at the appropriate matching speeds to get horizontal tool head movement while keeping the tool vertical, considerable training and skill are required for an operator to be highly productive; the operator must learn to control three movements simultaneously.

These drawings of the prior art assist in visualizing that throughout the horizontal travel of the tool the base ends of both the stick and the boom cylinders remain pressurized. The weight of the hoist boom 6, stick boom 7, head 12 and tree 5 all are supported against pivoting about the hoist-base pivot pin 8 by the hoist cylinder 10 acting as a strut, with oil in its base end and conduit 102 being under pressure. The oil in the base end of the stick cylinder 11 and in conduit 103 is similarly pressurized by the weights of the stick boom 7, the head 12 and the tree 5. Laws of trigonometry for efficient design and full use of components cause these two base end pressures on most machines manufactured, even in the prior art, to be nearly equal to each other for most of the distance of horizontal tool travel, even though they are never connected together. When a directional valve is manually activated to extend one of these cylinders the pump supplies pressurized oil to the base, while the rod end oil is dumped to the hydraulic oil reservoir. When the valve is used to retract a cylinder, the base end oil is dumped to the reservoir while pumped oil is used to fill the rod end.

Figure 3A:
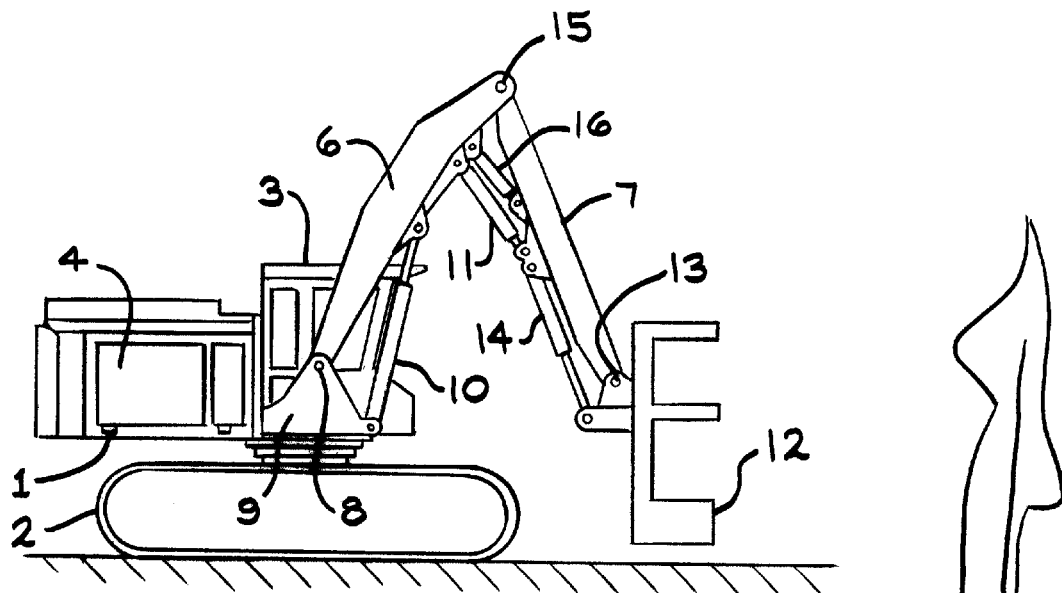
FIGS. 3A and 3B are side elevation views of the preferred embodiment of the present invention and showing how the cylinders extend and contract between retracted and extended boom positions.
Figure 3B:
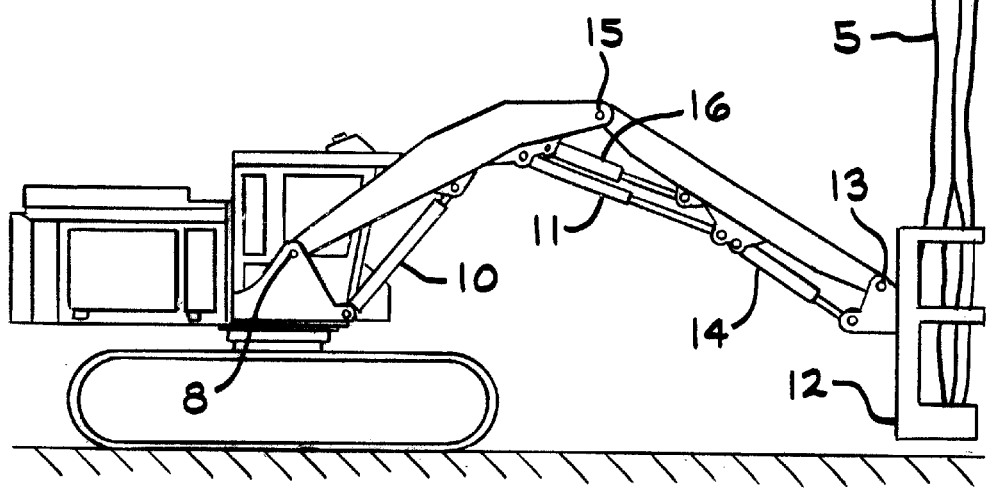
Figure 4:
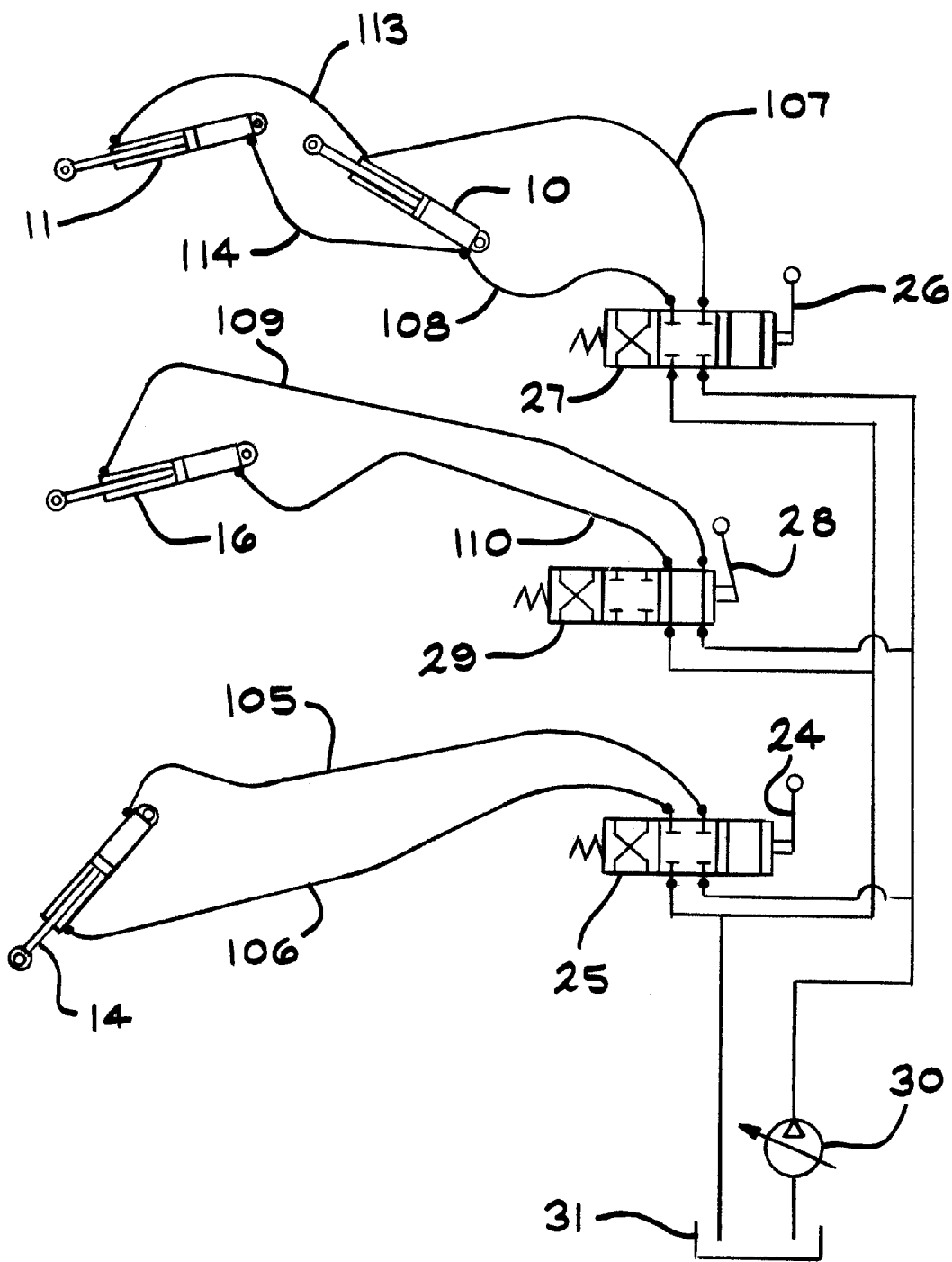
FIG. 4 is a schematic diagram of oil flow conduit connections between the major components of the present invention.
Figure 5:
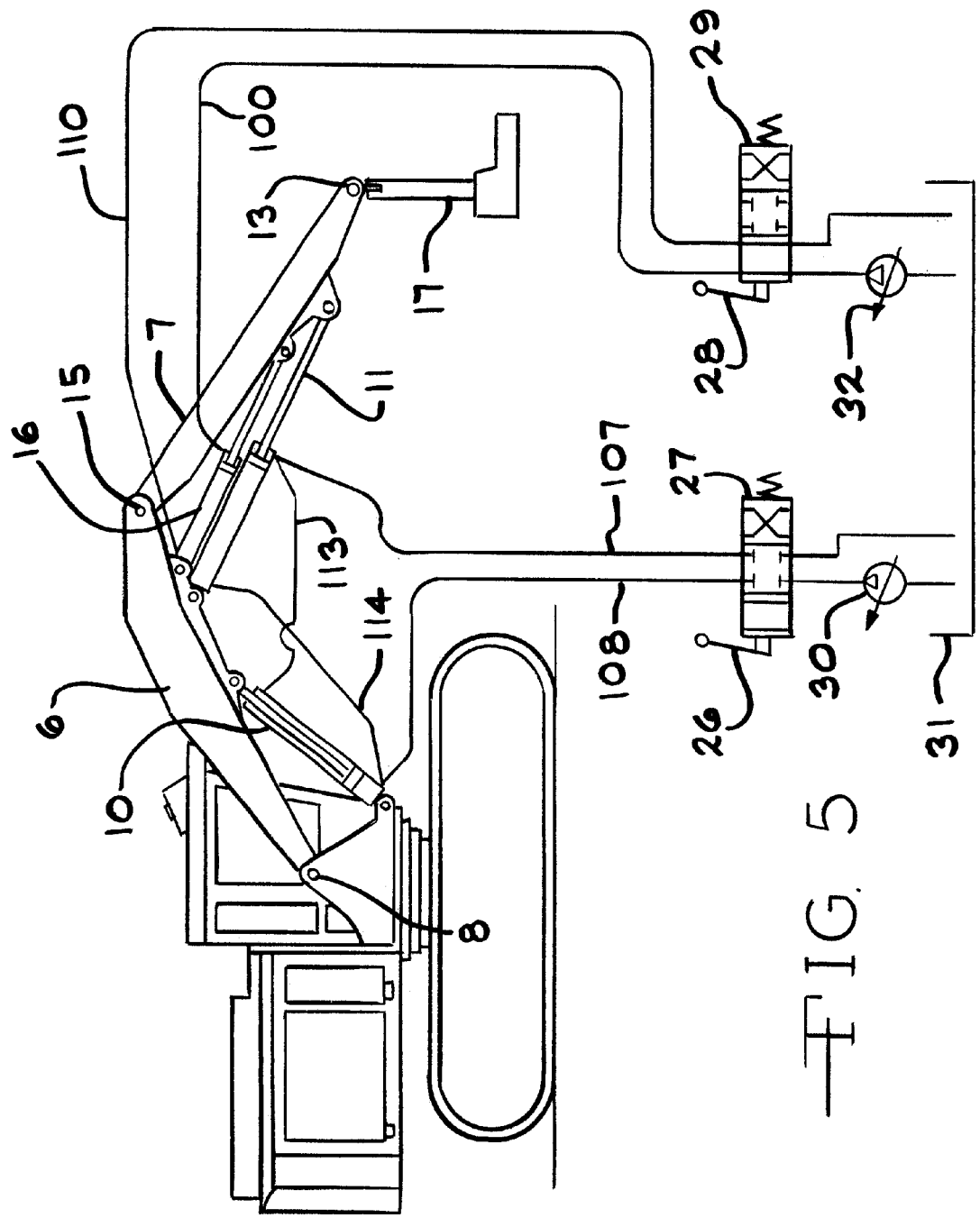
FIG. 5 is a side elevation view showing a simple use of the present invention, in which there is no power tilt for the tool or head. The hydraulic components and the essential conduit lines that connect them are shown schematically.

In the invention, as shown in FIGS. 3A and 3B, the hoist cylinder 10 and the stick cylinder 11 remain pinned into the knuckle boom much as in the prior art, but the hydraulic conduit connections are changed as can be seen in FIGS. 4 and 5. An additional cylinder, called a "reach" cylinder 16, is pinned into the knuckle boom geometry, between the hoist boom and the stick boom, to alter and hold the angle between them. The tilt cylinder 14 and its circuit in this preferred embodiment are unchanged from the prior art in FIG. 2.

FIG. 4 is a simplified schematic showing how the hydraulic connections are made to reduce reach energy consumption. Although the bank of valves need not be physically changed, the hoist valve 21 of the prior art becomes the "lift" valve 27 of the invention. The stick valve 23 becomes the reach valve 29. The tilt valve 25 and the hoist, stick and tilt cylinders 10, 11 and 14 remain substantially unchanged. Conduits 107 and 108 (corresponding to conduits 101 and 102 of FIG. 2) still connect the ports of the hoist cylinder 10 to the work ports of valve 21. However, the stick cylinder 11 is not connected at all to valve 29 (corresponding to valve 23 in FIG. 2), but instead is connected by means of conduit 114 to conduit 108, which in effect unites the base end volume of the hoist cylinder 10 with the base end volume of the stick cylinder 11. That is, the hoist cylinder and stick cylinder base ends are piped together and to a valve work port with hydraulic conduit, so that they share a common load-supporting pressurized volume or "slug" of oil behind their pistons. With a routine calculation in selecting appropriate rod and piston diameter sizes, as is known in the art, conduits 107 and 113 can be used to similarly provide a hydraulic connection to the rod end ports of the hoist cylinder 10 and stick cylinder 11. Alternatively, the rod end ports can be connected for connection via a valve to either the reservoir or the supply, for example in one embodiment they are connected together as is the case with the base ends, but that is not essential, and some significant benefit from the invention can be achieved without such a connection. It is the load-supporting hydraulic oil, for example the oil in the base ends of the hoist and stick cylinders, which is more important. Even though during normal operations no load is supported by the rod-end oil and it might expediently be connected to the reservoir 31, it is preferred to be able to pressurize it so that the boom is also usable for pushing down with its tool end in certain operating and maintenance situations.

Thus the lift valve 27 merely controls the volume of the hydraulic oil slug which is free to shuttle between the base ends of the hoist and stick cylinders (and between the rod ends of those cylinders, if connected so that this is applicable to them as well). Examining this situation, one can see that, ignoring friction, there is nothing in this hoist and stick cylinder arrangement which prevents free in and out reaching motion of the knuckle boom. All that happens as the boom is retracted or extended is that the slug of oil flows back and forth freely between the respective cylinders. Thus as the boom extends from the position of FIG. 3A to the position of FIG. 3B, hydraulic oil leaves the base end of the hoist boom so that it retracts, and shuttles to the base end of the stick boom so that it extends. At the same time, of course, hydraulic oil leaves the rod end of the stick boom, and shuttles to the rod end of the hoist boom.

Of course, this free reaching of the boom cannot be allowed, so this is where the "reach" cylinder 16 comes into play. By means of a directional valve 29 the reach cylinder 16 is used to adjust and set the stick-to-hoist boom angle, and thus control the reach. The reach cylinder does not primarily support the loads, as that is accomplished by the slug in the hoist and stick cylinders; the reach cylinder only alters the angle between the stick boom and the hoist boom.

As mentioned above, the tilt mechanism of the prior art can be retained, as in the preferred embodiment, and indeed normally would be retained. However, FIG. 5 is a schematic representation showing the components and hydraulic connections of the simplest embodiment of the invention, in which there is no tilt control, which may be acceptable for some applications of the invention. FIG. 5 illustrates how both the stick and hoist cylinders are made to stroke simultaneously with one control movement, for example, operation of control lever 26.

When both valves 27 and 29 are in their center positions (as valve 27 is drawn), the pumps supply no oil to the cylinders, nor can any oil escape from the cylinders to the reservoir 31. The weights of the tool 17, the hoist boom 6, stick boom 7, stick cylinder 11 and reach cylinder 16 all tend to pivot the entire boom assembly down around hoist-base pivot pin 8. The hoist cylinder 10 resists this rotation with a force from oil pressure in its base end sufficient to match the loading moments.

At hoist-stick pivot pin 15 only the stick boom 7 and the tool 17 cause a loading moment and force, which must be shared by the stick cylinder and the reach cylinder. How this loading is shared by these two cylinders is an important part of this invention. Because conduit 114 connects the base end ports of the hoist cylinder 10 and the stick cylinder 11, the pressure provided by the hoist cylinder 10 to the base of the stick cylinder 11 is whatever is needed for the hoist cylinder 10 to support the entire boom, as just described. This hoist pressure acting in the stick cylinder 11 provides a moment about hoist-stick pivot pin 15, which opposes the downward moment of weights of the stick boom 7 and tool 17. If this stick cylinder moment is less than the loading, then reach cylinder 16 (being locked with trapped hydraulic oil) develops enough base end pressure to produce a force that makes up the moment difference so that the stick and its tool do not pivot down. If the stick cylinder moment with its hoist-dictated pressure is more than needed at the hoist-stick pivot pin 15 to hold up the stick boom and the tool, then the reach cylinder will develop a rod end pressure to resist the excess.

To gain the energy-saving benefits of the invention, those implementing the invention will select the cylinder sizes and their acting geometry. This selection will be used with ordinary knowledge in the industry, so that when the system is operated by stroking the reach cylinder, the pressure that the hoist cylinder sends to the stick cylinder is right for it to support the moments about the stick pivot, with little assistance from the reach cylinder for much of the reach range. The volume of oil flowing from the stick cylinder to the hoist cylinder (when retracting reach) remains pressurized so that the loads can be supported in a new reach position without having dumped nor added pumped oil. In the prior art of FIGS. 1A and 1B, by contrast, stick cylinder 11 oil is dumped to the reservoir and new oil is pumped to extend hoist cylinder 10.

If the cylinder sizes and geometry are calculated such that the reach cylinder exerts a significant amount of force to assist the stick cylinder or to hold it back, and the boom point travel is not nearly horizontal with single control lever action, then the energy saving will be somewhat reduced. This should not be considered a failure of the invention because some knuckle boom applications might be preferred to work that way, accepting the energy saving still obtained by exchanging at least some of the working oil by means of conduit 114 instead of dumping and pumping all of the oil.

To achieve maximum energy savings during reaching it is necessary to lay out the boom geometry and cylinder strokes and diameters so that the volume of oil in the base end of the hoist cylinder plus the volume in the base of the stick cylinder plus the volume in conduits 108 and 114 remains nearly constant as the felling head is moved, for example from the position in FIG. 3A to that in FIG. 3B. Since existing wood harvesting knuckle booms are usually already designed to do equal amounts of work with their sticks and hoists, this can easily be done by those skilled in the art.

As shown in FIGS. 4 and 5, the rod ends of the stick and hoist cylinders are also connected directly together by means of conduit 113 and also to the other work port of valve 27 by means of conduit 107. During reaching action another, smaller slug of oil will be shunted between the rod ends of those cylinders. As stated previously, even though during normal operations no load is supported by the rod-end oil, it is preferred to be able to pressurize it so that the boom is also usable for pushing down with its tool end in certain operating and maintenance situations.

In order to use this preferred rod-end connection arrangement those skilled in the art will calculate to ensure that the ratio of the piston rod diameter to the piston diameter is the same in both the hoist and stick cylinders. This will prevent unwanted oil pressure build up and cavitation in the rod-ends when the work ports in valve 27 are closed and the stick cylinder is being stroked by the reach cylinder. It is apparent that the stroke distance relationship of the cylinders is determined by a trapped and fixed amount of oil flowing from one base cavity to the other and is inversely proportional to the piston areas. The oil slug trapped in the rod ends of the cylinders is subject to the same stroke distance and we must have the same piston areas, net of rods, for the slug to be accepted. This is sometimes possible by selecting appropriate rod and seal sizes from catalogs.

One alternative to using specially sized cylinders is to use cylinders that have the same bore size and the same rod size for both the stick and the hoist. This usually requires that the two hoist cylinders be used with one stick cylinder.

DESCRIPTION OF INVENTION

There are circumstances where it is not possible or desirable to select cylinders with specially sized bores and rods or to use dual hoist cylinders. Often only certain rod and bore sizes are available or using existing cylinders is highly advantageous. Also under certain conditions, an exchange of fluid from the cylinders may be required even if the area ratios are maintained. This can occur when a cylinder operates on a cushion.

In these cases, where a mismatch or a transient condition requires an exchange of fluid from the cylinders, another valve is required to control the release of fluid from the stick and hoist cylinder.

Figure 6:
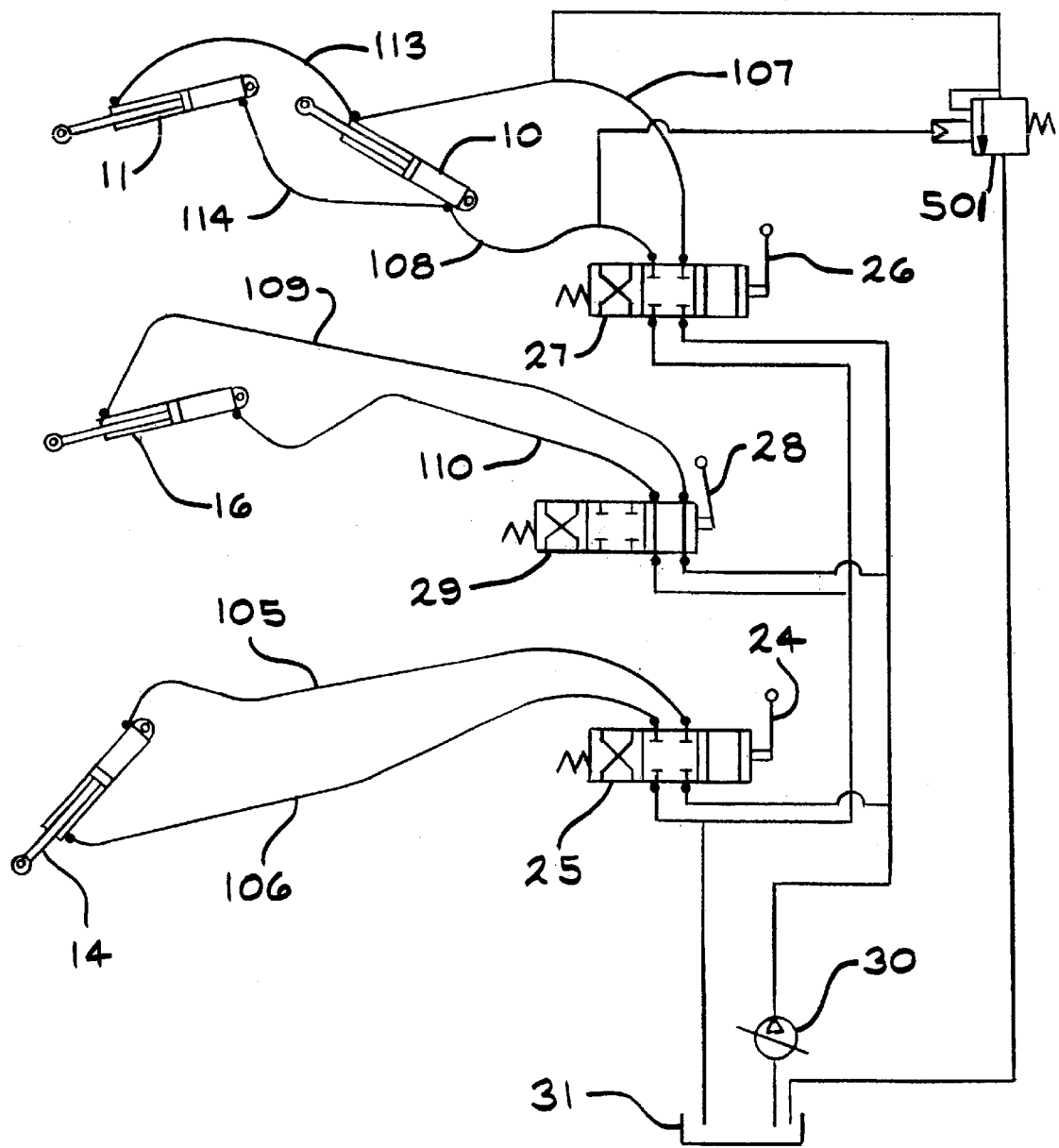
FIG. 6 is a schematic diagram showing a dumping valve to allow rod end oil from the hoist and stick cylinders to flow to the tank if necessary whenever the base ends of the cylinders are pressurized.
Figure 6A:
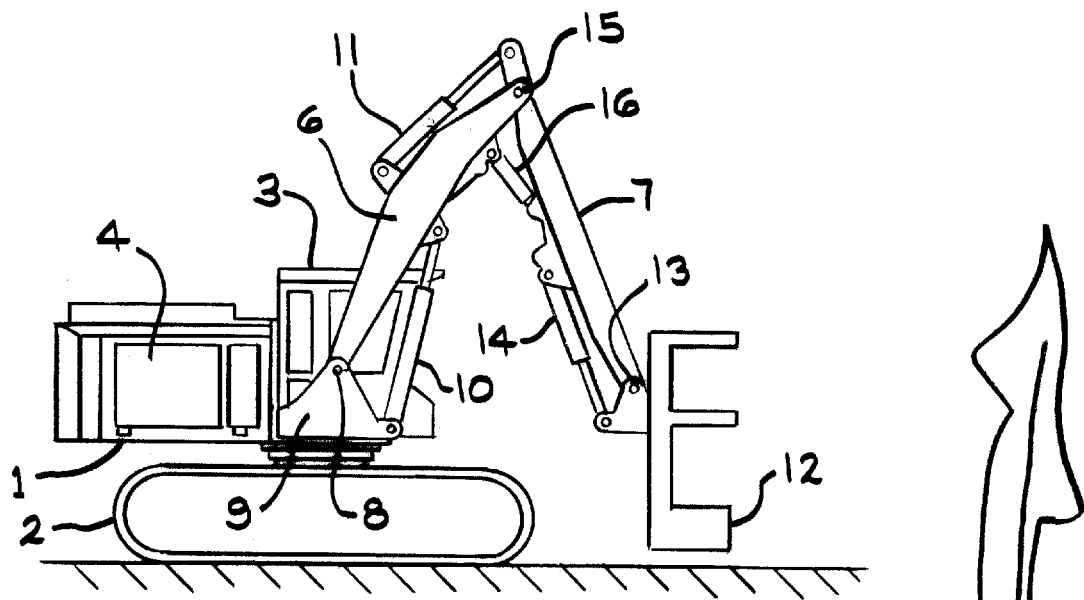
Figure 7:
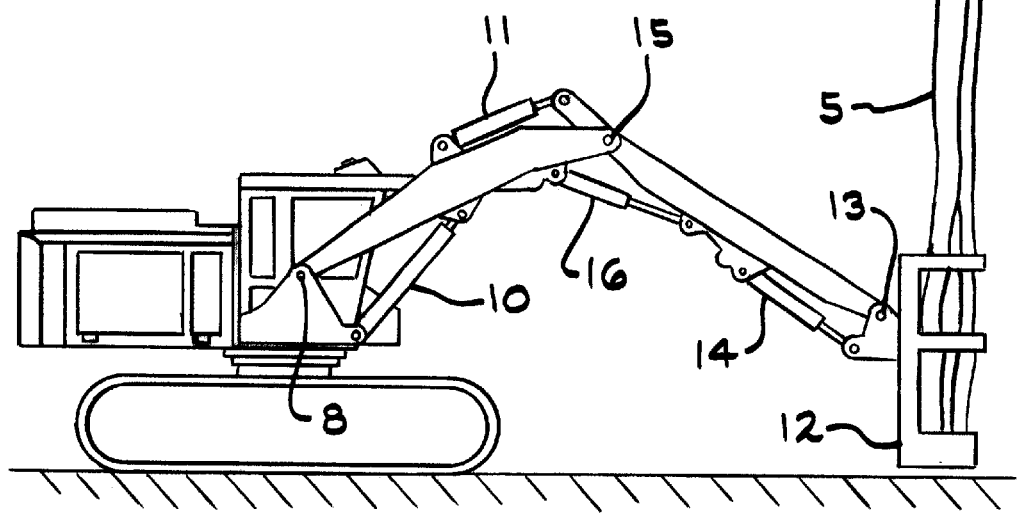
FIG. 7 shows a boom configuration where the boom cylinder pushes and the stick cylinder pulls to support the implement and payload.
Figure 8:
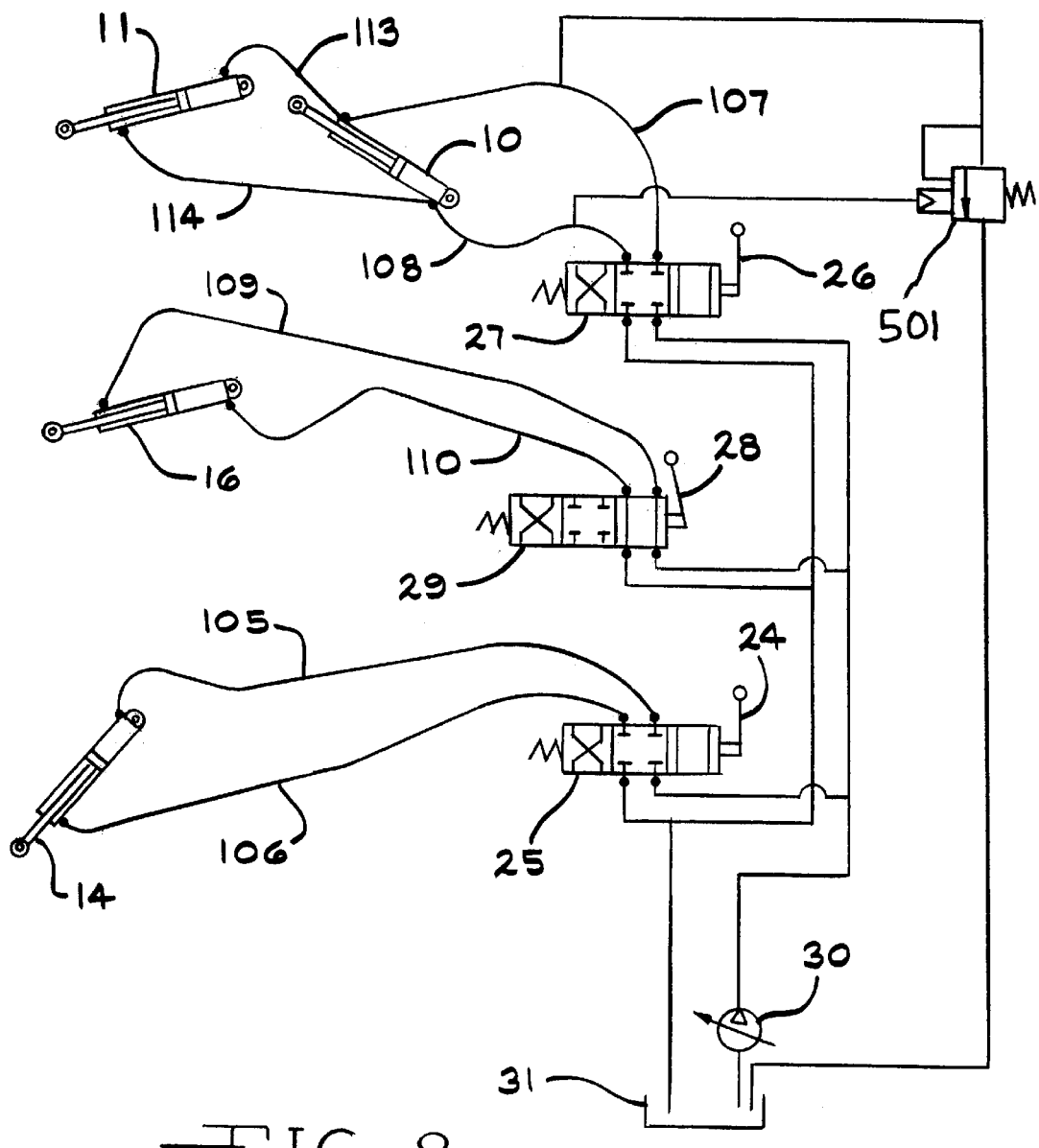
FIG. 8 is a schematic showing the plumbing of FIG. 7.

FIG. 6 (and indirectly, FIGS. 7 and 8) show valve 501 added to the hydraulic circuit of FIG. 4. It is shown as a counter balance valve, but other types of valves could be used such as sequence valves and pilot operated check valves. If the area ratios of cylinder 10 and 11 are not matched, then stroking cylinder 16 while valve 27 is closed will cause a volume change in cylinders 10 and 11. If the total volume decreases (which will occur with movement in 1 direction), then fluid must be removed from cylinders 10 and 11 otherwise, pressure will increase and the boom will not operate efficiently or may not function at all.

Valve 501 allows fluid to exchange from the lowering ends of cylinders 10 and 11 (conduits 107 and 113) whenever the lifting ends of cylinders 10 and 11 (conduits 108 and 114) are pressurized. During a tree harvester work cycle the boom generally supports the implement and the payload and the lifting ends (conduits 108 and 114) are pressurized. This allows excess fluid to move from the lowering ends of the cylinders (conduits 107 and 113) and prevents a build up of pressure. Cylinder 16 can then be stroked freely independent of the state of valve 27. So the operator is able to operate the machine without special intervention to deal with moving fluid from the cylinders.

During an operation where the implement is pushed into the ground, the lifting ends of cylinders 10 and 11 (conduits 108 and 114) would lose pressurization and the valve 501 would close. This would allow pressurization of the lowering ends of cylinders 10 and 11 (conduits 107 and 113).

However, stroking cylinder 16 in one direction would cause a decrease in total volume in cylinders 10 and 11 and would cause excess pressurization since there is no way for excess fluid to leave the cylinders. This would cause inefficient operation of the boom or may cause the boom to not function altogether. However, during operations where the implement is pushed into the ground, it is likely that the operator is actuating valve 26 to push the implement further into the ground. This would allow excess fluid in the lowering ends (conduits 108 and 114) to leave the cylinders and prevent excess pressurization. This operation is completely natural and unobtrusive to the operator.

I claim:

1. An tree-gathering apparatus comprising:
   a foundation in which the tree-gathering apparatus is positioned thereon;
   a first extension having a first proximal end pivotably connected to the tree-gathering apparatus and a first distal end remote therefrom;
   a second extension having a second distal end and a second proximal end that is pivotably connected to the first distal end;
   a first hydraulic cylinder mounted between the foundation and the first extension, the first hydraulic cylinder having a first lowing end and a first lifting end;
   a second hydraulic cylinder mounted between the first extension and the second extension, the second hydraulic cylinder having a second lowering end and a second lifting end;
   a first fluid interconnection system containing a first hydraulic fluid having a first conduit connecting the first lifting end with the second lifting end so the first hydraulic fluid traverses between the first lifting end and the second lifting end and a second conduit connecting the first conduit to a reservoir through a first valve so the first hydraulic fluid can go into and out of the reservoir;
   a first pressure system that provides fluid pressure to the first fluid interconnection system, through the first valve and the second conduit, to move the first hydraulic fluid between the first conduit and the reservoir in order for the first and second hydraulic cylinders to operate with a predetermined quantity of the first hydraulic fluid;
   a second fluid interconnection system containing a second hydraulic fluid having a third conduit connecting the first lowering end with the second lowering end so the second hydraulic fluid traverses between the first lowering end and the second lowering end, and a fourth conduit connecting the third conduit to the reservoir through a second valve so the second hydraulic fluid can into and out of the reservoir;
   a second pressure system that provides fluid pressure to the second fluid interconnection system, through the second valve to move the second hydraulic fluid between the second fluid interconnection system and the reservoir in order for the first and second hydraulic cylinders to operate with a predetermined quantity of the second hydraulic fluid;
   a third valve to allow the second hydraulic fluid to move between the second fluid interconnection system and the reservoir; and
   a third hydraulic cylinder pinned to stroke between the first extension and the second extension used for extending and retracting the second distal end of the second extension.

2. The apparatus of claim 1 wherein the third valve allows the second hydraulic fluid to move from the second fluid interconnection system to the reservoir only when the first fluid interconnection system is pressurized.

3. The apparatus of claim 1 wherein the third valve allows the second hydraulic fluid to move from the second fluid interconnection system to the reservoir only when the third hydraulic cylinder extends.

4. The apparatus of claim 1 wherein the third valve allows the second hydraulic fluid to move from the second fluid interconnection system to the reservoir only when the third hydraulic cylinder retracts.

5. An tree-gathering apparatus comprising:
 a foundation in which the tree-gathering apparatus is positioned thereon;
 a first extension having a first proximal end pivotably connected to the tree-gathering apparatus and a first distal end remote therefrom;
 a second extension having a second distal end and a second proximal end that is pivotably connected to the first distal end;
 a first hydraulic cylinder mounted between the foundation and the first extension, the first hydraulic cylinder having a first lowing end and a first lifting end;
 a second hydraulic cylinder mounted between the first extension and the second extension, the second hydraulic cylinder having a second lowering end and a second lifting end;
 a first fluid interconnection system containing a first hydraulic fluid having a first conduit connecting the first lifting end with the second lifting end so the first hydraulic fluid traverses between the first lifting end and the second lifting end and a second conduit connecting the first conduit to a reservoir through a first valve so the first hydraulic fluid can go into and out of the reservoir;
 a first pressure system that provides fluid pressure to the first fluid interconnection system, through the first valve and the second conduit, to move the first hydraulic fluid between the first conduit and the reservoir in order for the first and second hydraulic cylinders to operate with a predetermined quantity of the first hydraulic fluid;
 a second fluid interconnection system containing a second hydraulic fluid having a third conduit connecting the first lowering end with the second lowering end so the second hydraulic fluid traverses between the first lowering end and the second lowering end, and a fourth conduit connecting the third conduit to the reservoir through a second valve so the second hydraulic fluid can into and out of the reservoir;
 a second pressure system that provides fluid pressure to the second fluid interconnection system, through the second valve to move the second hydraulic fluid between the second fluid interconnection system and the reservoir in order for the first and second hydraulic cylinders to operate with a predetermined quantity of the second hydraulic fluid;
 a third valve to allow the second hydraulic fluid to move between the second fluid interconnection system and the reservoir; and
 a third hydraulic cylinder pinned to stroke between the foundation and the first extension used for extending and retracting the second distal end of the second extension.

6. The apparatus of claim 5 wherein the third valve allows the second hydraulic fluid to move from the second fluid interconnection system to the reservoir only when the first fluid interconnection system is pressurized.

7. The apparatus of claim 5 wherein the third valve allows the second hydraulic fluid to move from the second fluid interconnection system to the reservoir only when the third hydraulic cylinder extends.

8. The apparatus of claim 5 wherein the third valve allows the second hydraulic fluid to move from the second fluid interconnection system to the reservoir only when the third hydraulic cylinder retracts.

* * * * *